(12) United States Patent
Khan et al.

(10) Patent No.: US 11,194,409 B2
(45) Date of Patent: Dec. 7, 2021

(54) DISPLAY APPARATUS FOR TRANSMITTING DATA THROUGH ELECTRONIC PEN AND CONTROL METHOD THEREOF

(71) Applicant: SAMSUNG ELECTRONICS CO., LTD., Suwon-si (KR)

(72) Inventors: Md. Mahmud Muntakim Khan, Dacca (BD); Faisal Khan, Dacca (BD); M. Shaykat Shuva, Dacca (BD)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/971,854

(22) PCT Filed: Jan. 28, 2019

(86) PCT No.: PCT/KR2019/001163
§ 371 (c)(1),
(2) Date: Aug. 21, 2020

(87) PCT Pub. No.: WO2019/164143
PCT Pub. Date: Aug. 29, 2019

(65) Prior Publication Data
US 2021/0011563 A1    Jan. 14, 2021

(30) Foreign Application Priority Data
Feb. 22, 2018 (KR) .................. 10-2018-0020937

(51) Int. Cl.
*G06F 3/0354* (2013.01)
*H04W 48/18* (2009.01)
*G06F 3/0484* (2013.01)

(52) U.S. Cl.
CPC ........ *G06F 3/03545* (2013.01); *H04W 48/18* (2013.01); *G06F 3/04842* (2013.01)

(58) Field of Classification Search
CPC . G06F 3/03545; G06F 3/04842; H04W 48/18
See application file for complete search history.

(56) References Cited

U.S. PATENT DOCUMENTS 6,374,336 B1 * 4/2002 Peters ................. G06F 11/1076
711/167
9,690,404 B2    6/2017 Kim et al.
(Continued)

FOREIGN PATENT DOCUMENTS

JP    6-175802    6/1994
JP    4760986    8/2011
(Continued)

OTHER PUBLICATIONS

International Search Report for PCT/KR2019/001163 filed Apr. 26, 2019, 5 pages with English Translation.
(Continued)

*Primary Examiner* — Ariel A Balaoing
(74) *Attorney, Agent, or Firm* — Nixon & Vanderhye, P.C.

(57) ABSTRACT

The present invention relates to a display apparatus for transmitting content data and a control method thereof. In particular, the present invention relates to a display apparatus for transmitting data of a content of an electronic device by using an electronic pen and a method thereof. In particular, a data sharing method of the display apparatus comprises the steps of: displaying a content; when one of objects included in the content is selected by an electronic pen, identifying a size of data corresponding to the selected object; and transmitting the data through the electronic pen when the size of the data is smaller than or equal to storage capacity of the electronic pen, or transmitting identification information on the data and access information of the display apparatus through the electronic pen when the size (Continued)

of the data exceeds the storage capacity of the electronic pen.

8 Claims, 13 Drawing Sheets

(56) References Cited

U.S. PATENT DOCUMENTS

| | | | | |
|---|---|---|---|---|
| 2005/0220060 | A1* | 10/2005 | Takusagawa | H04L 67/06 370/338 |
| 2007/0165912 | A1* | 7/2007 | Liu | G06F 3/038 382/120 |
| 2013/0267172 | A1* | 10/2013 | Ko | H04W 4/80 455/41.1 |
| 2014/0028598 | A1 | 1/2014 | Yoo et al. | |
| 2014/0059169 | A1* | 2/2014 | Ko | G06F 3/04845 709/217 |
| 2014/0253470 | A1 | 9/2014 | Havilio | |
| 2014/0280755 | A1* | 9/2014 | Memon | H04L 67/02 709/219 |
| 2015/0103708 | A1* | 4/2015 | Kang | H04W 52/0235 370/311 |
| 2015/0213782 | A1* | 7/2015 | Yan | G06F 3/04162 345/173 |
| 2016/0112096 | A1* | 4/2016 | Zhao | H04W 4/80 455/41.1 |
| 2016/0134738 | A1* | 5/2016 | Liu | H04W 76/10 455/557 |
| 2019/0083881 | A1 | 3/2019 | Li et al. | |

FOREIGN PATENT DOCUMENTS

| | | |
|---|---|---|
| KR | 10-2013-0117394 | 10/2013 |
| KR | 10-2014-0016050 | 2/2014 |
| KR | 10-2014-0027034 | 3/2014 |
| KR | 10-2017-0020286 | 2/2017 |
| WO | 2017/183743 | 10/2017 |

OTHER PUBLICATIONS

Written Opinion of the ISA for PCT/KR2019/001163 filed Apr. 26, 2019, 12 pages with English Translation.

\* cited by examiner

DISPLAY APPARATUS FOR TRANSMITTING DATA THROUGH ELECTRONIC PEN AND CONTROL METHOD THEREOF

This application is the U.S. national phase of International Application No. PCT/KR2019/001163 filed Jan. 28, 2019 which designated the U.S. and claims priority to KR Patent Application No. 10-2018-0020937 filed Feb. 22, 2018, the entire contents of each of which are hereby incorporated by reference.

FIELD

The disclosure relates to a display apparatus for transmitting content data and a control method thereof. Specifically, the disclosure relates to a display apparatus for transmitting content data of an electronic apparatus using an electronic pen and a control method thereof.

DESCRIPTION OF RELATED ART

Portable electronic apparatuses that provide various functions such as voice and image call functions, information search, content provision, data storing, and the like have become a necessity to the modem man. Accordingly, in addition to the portable electronic apparatus, secondary periphery electronic apparatuses may be newly introduced. For example, an electronic pen for easily controlling the portable electronic apparatus has been provided together with the portable electronic apparatus.

In order to share data such as photos, videos, documents and music between the portable electronic apparatuses, a user has to perform various operations to connect between the user electronic apparatus and the electronic apparatus subject to sharing. For example, operation of turning-on a communication protocol function such a an NFC and a Bluetooth for communication connectivity between the user electronic apparatus and the electronic apparatus subject to sharing, operation for connecting therebetween, operation for selecting data for sharing, operation for starting transfer of data, and the like may be needed.

Accordingly, in the past, there has been attempts for sharing content through an electronic pen. That is, sharing of content data was attempted by transferring data with an electronic pen connecting a communication link between the portable electronic apparatus and the electronic pen, and transferring data to an external electronic apparatus from the electronic pen.

However, due to limitation of data size which the electronic pen is able to accommodate using the conventional sharing method, there has been a limitation to a convenient way of data sharing. Accordingly, there is a need for a sharing method that while maintaining a convenient data sharing interface through the electronic pen, is not limited to data size.

SUMMARY

The disclosure provides a data transmitting display apparatus that while maintaining a content data sharing interface, is not limited to data size and a control method thereof.

According to an embodiment, a method of sharing data through a display apparatus includes displaying content, checking data size corresponding to a selected object when one of the objects included in the content is selected by an electronic pen, and transferring the data with the electronic pen if the data size is less than or equal to a storage capacity of the electronic pen and transferring an identification information on the data and an access information on the display apparatus with the electronic pen if the data size exceeds the storage capacity.

The transmitting the data to the external display apparatus may be further included when an external display apparatus, which received a token including identification information on the data and access information on the display apparatus from the electronic pen, accesses the display apparatus.

The identifying whether the received token and identification information provided to the electronic pen and access information on the display apparatus is a match when the external display apparatus which received a token including identification information on the data and access information on the display apparatus from the electronic pen, accesses the display apparatus, and the transferring of the data to the external display apparatus when the received a token and the identification information provided to the electronic pen and access information on the electronic apparatus is a match may be further included.

The detecting the data size may comprise, based on the electronic pen being pressed to one object while a hold button provided on the electronic pen is in a pressed state, detecting a data size corresponding to a pressed object.

The identifying a communication method with the electronic pen based on a data size corresponding to the selected object may be further included.

The transferring may be, based oil the data size being less than or equal to a predetermined first value, communicating with the electronic pen with a near field communication (NFC) method, and based on the data size exceeding the first value and being less than or equal to a second value, communicating with the electronic pen with a Bluetooth method, and based on the data size exceeding the second value, communicating with the electronic pen with a Wi-Fi method.

According to an embodiment, a display apparatus includes a display, a communicator, a memory storing information on a storage capacity of an electronic pen, and a processor, and the processor is configured to control the display to display content, and based on an object having a data size of less than or equal to a storage capacity of the electronic pen stored in the memory of the objects included in the content being selected by an electronic pen, the data of the object is transferred to the electronic pen, and based on an object having a data size exceeding the storage capacity being selected by the electronic pen, control the communicator to transmit identification information on the data and access information on the display apparatus to the electronic pen.

The processor may be configured to, based on an external electronic apparatus which received a token including identification information on the data and access information on the electronic apparatus from the electronic pen accessing the electronic apparatus, control the communicator to transmit the data to the external electronic apparatus.

The processor may be configured to, based on an external display apparatus which received a token including identification information on the data and access information on the display apparatus from the electronic pen accessing the display apparatus, identify whether the received token and the identification information provided by the electronic pen and access information on the display apparatus is a match, and based on the received token and identification information provided by the electronic pen and access information on the display apparatus matching, control the communicator to transmit data to the external display apparatus.

The processor may be configured to, based on the electronic pen being pressed to one object as a hold button provided on the electronic pen is in a pressed state, detect a data size corresponding to the pressed object.

The processor may be configured to identify a communication method with the electronic pen based on a data size corresponding to the selected object.

The processor may be configured to, based on the data size being less than or equal to a predetermined first value, control the communicator to communicate with the electronic pen via NFC method, and based on the data size exceeding a predetermined first value and being less than or equal to a second value, control the communicator to communicated with the electronic pen via Bluetooth method, and based on the data size exceeding a predetermined second value, control the communicator to communicate with the electronic pen via Wi-Fi method.

According to an embodiment, an electronic pen capable of being provided with a display apparatus may include a memory, a communicator, and a processor, and the processor may be configured to, based on data being transferred from the first display apparatus touched by the electronic pen, store the data in the memory, and based on the electronic pen touching the second display apparatus, control the communicator to transmit the data to the second display apparatus, and based on identification information on the object and access information on the first display apparatus being transmitted from the first display apparatus touched by the electronic pen, generate a token using the identification information and the access information to store in the memory, and based on the electronic pen touching the second display apparatus, control the communicator to transmit the token to the second display apparatus.

The method of sharing data using an electronic pen may include, storing data in a memory when data is transferred from a first display apparatus which has been touched by the electronic pen, transferring the data to the second display apparatus when the electronic pen touches the second display apparatus, and the storing in the memory includes using the identification information and the access information to generate a token and storing in the memory, and the transferring may include transferring the token to the second display apparatus when the electronic pen touches the second display apparatus.

The disclosure uses an electronic pen to provide a user interface which may be easily share data, which is not limited by data size, with an external electronic apparatus. Further, by changing the communication connection protocol based on a size of data to be shared data may be efficiently shared.

DETAILED DESCRIPTION OF EXAMPLE EMBODIMENTS

Figure 1:
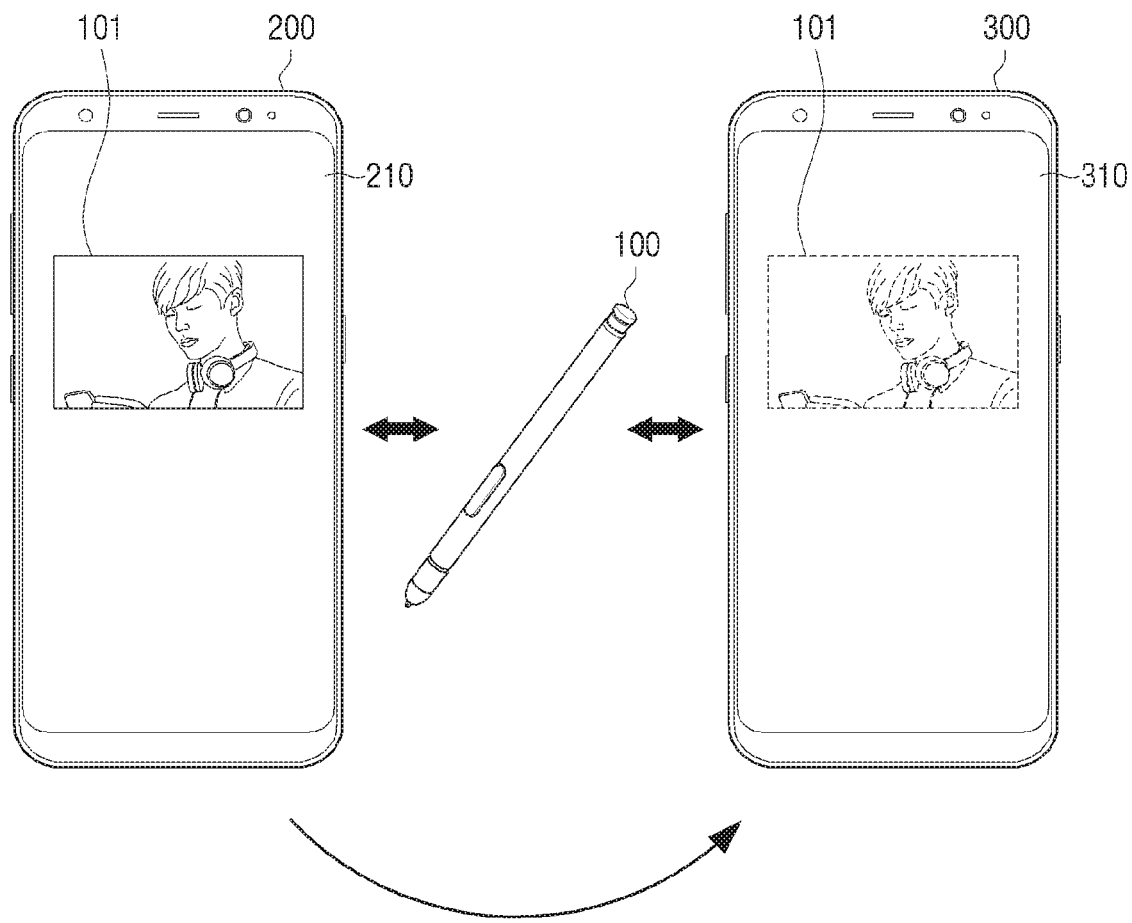
FIG. 1 is a diagram illustrating a data sharing system through a display apparatus according to an embodiment of the disclosure.

Example embodiments of the disclosure will be described in detail below with reference to the accompanying drawings. In case it is determined that in describing the disclosure, detailed description of related known technologies may unnecessarily confuse the gist of the disclosure, the detailed description thereof may be omitted. Further, the embodiments below may be modified to different forms of various types, and the technical scope of the disclosure as set forth herein may not be limited to the embodiment below. Rather, the embodiments are provided to more faithfully and fully describe the disclosure, and to fully convey the technical idea of the disclosure to those skilled in the art.

In addition, it is to be understood that when 'comprising' or 'including' a certain element, it is not precluding another element but further adding other elements, unless specified otherwise. Further, it is to be understood that the various factors and areas in the drawings are drawn schematically. Accordingly, the technical idea of the disclosure is not limited to the relative size or distance drawing in the accompanying drawings.

FIG. 1 is a diagram illustrating a data sharing system using a display apparatus and an electronic pen according to an embodiment of the disclosure.

In FIG. 1, a display apparatus 200 and an external display apparatus 300 has been illustrated as a mobile phone, but the embodiment is not necessarily limited thereto, and may be implemented to various types. For example, the display apparatus 200 may be implemented to various types such as a tablet personal computer (PC), a laptop PC, a PC, a television (TV), an MP3 player, gaining console, a kiosk, an electronic frame, a table display, a monitor, an electronic whiteboard, a smart refrigerator, and the like. In addition thereto, the display apparatus 200 may refer to an apparatus of all types including a touch screen or a display. Further, although only the designation of display apparatus is disclosed in the disclosure, other various designations such as a user terminal apparatus and an electronic apparatus may be disclosed.

A user may touch of bring to proximity with the display a finger or an electronic pen 100, to use the display apparatus 200. The electronic pen 100 may be a general pen form. Although, the electronic pen 100 may be referred to various designations such as stylus pen, touch pen, and S-pen, it will be described as an electronic pen 100 in the disclosure for convenience of description.

The electronic pen 100 implemented in a pen form may be inserted into a groove (not shown) provided on the display apparatus 200. When a user intends to use the electronic pen 100, the electronic pen 100 may be separated from the groove. When the electronic pen 100 is removed from the groove, the display apparatus 200 may display icons on applications or functions appropriate for use or automatically execute the applications or functions.

The user may use the electronic 100 to select a content object 101 the display 210 of the display apparatus 200 is displaying. When a size of a content data of an object 101 selected by the electronic pen 100 is less than or equal to a predetermined value, the display apparatus 200 may transmit data to the electronic pen 100. If the user at this time uses the electronic pen 100 to touch the display 310 of the external display apparatus 300, the electronic pen 100 may transfer data on content received from the display apparatus 200 to the external display apparatus 300. The external display apparatus 300 which received data on content from the electronic pen 100, may display an object 101 on the corresponding content on the display 310.

When the size of content data corresponding to the object 101 the user selected using the electronic pen 100 exceeds a predetermined value, the display apparatus 200 may transmit identification information on data and information for accessing the display apparatus 200 to the electronic pen 100. The electronic pen 100 may generate a token based on identification information on data transmitted from the display apparatus 200 and access information for accessing the display 200. In addition, when the user uses the electronic pen 100 to touch the display 310 of the external display apparatus 300, the electronic pen 100 may transfer the token generated by the electronic pen 100 to the external display apparatus 300. The external display apparatus 300 which received the token transferred from the electronic pen 100 may use the token to request data on the corresponding content to be transferred to the display apparatus 200. The display apparatus 200 may at this time check if information contained in the token and information transmitted to the electronic pen 100 is a match, and may transmit the corresponding data to the external display apparatus 300 when information is a match.

Figure 2:
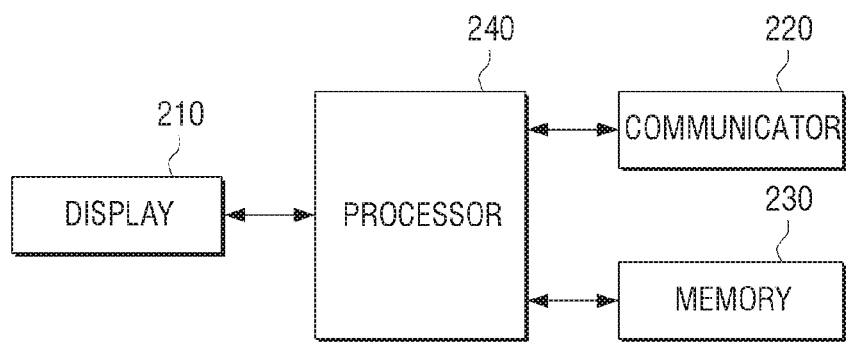
FIG. 2 is a block diagram illustrating an essential element of a display apparatus according to an embodiment of the disclosure.

Referring to FIG. 2, the display apparatus 200 which differently decides a data sharing method based on data size as described above may include a display 210, a communicator 220, a memory 230, and a processor 240.

The display 210 may display an object corresponding to a content data stored in the display apparatus 200. In addition, the display 210 may receive input of user command selecting a content through the electronic pen 100. Alternatively, the display 210 may receive user input of drawing a closed curve with a part of the content included through the electronic pen 100.

The user may use input means such as the electronic pen 100 or fingers to perform an interaction by touching or hovering the display 210. The hovering may refer to an operation of approaching an input means within a certain distance of the display 210. A plurality of electrodes for recognizing the electronic pen 100 may be disposed on the display 210. The plurality of electrodes may be disposed in parallel in a vertical and horizontal direction, and a first electrode group (not shown) may include a plurality of first electrodes (not shown) disposed in parallel in the first direction (vertical direction) The first electrode may be implemented as a transparent electrode such as indium tin oxide (ITO). The plurality of first electrodes may be used as a transmitting electrode outputting a transmission signal (Tx signal) for detecting a location of the electronic pen 100. A second electrode group (not shown) may be disposed as a plurality of second electrodes (not shown) disposed in parallel in a second direction (horizontal direction). The second electrodes may also be implemented as a transparent electrode. The plurality of second electrodes may be used as receiving electrodes receiving response signals output from the electronic pen 100.

The display 210 may have various sizes. For example, the display 210 may have sizes of 3-inches, 4-inches, 4.65-inches, 5-inches, 6.5-inches, 8.4-inches, 32-inches, 45-inches, and the like. The display 210 may consist of a plurality of pixels. The number of horizontal pixels X the number of vertical pixels of the plurality of pixels may be expressed in resolution.

The display 210 may be implemented as a display panel of various forms. For example, the display panel may be implemented using various display technology such as liquid crystal display (LCD), organic light emitting diodes (OLED), active-matrix OLED (AM-OLED), liquid crystal on silicon (LcoS) or digital light processing (DLP). In addition, the display 210 may be combined to at least one of a front surface area, a side surface area or a back surface area of the display apparatus 200 in a flexible display form.

The display 210 may be implemented to a touch screen of a layered structure. The touch screen may be provide with not only a display function but also a function for detecting not only a touch input position and touched area, but also touch input pressure, and may also be provided with the function for detecting not only a real-touch but also a proximity touch.

The communicator 220 may use the electronic pen 100 to transmit data corresponding to user selected content to the electronic pen 100. Alternatively, the communicator 220 may use the electronic pen 100 to transmit identification information of data corresponding to user selected content and information for accessing the display apparatus 200 to the electronic pen 100. The identification information of data may include a time stamp information on the data. The time stamp information may be a time unit parameter that indicates at a specific location in order to prove at which location the data is stored and present. The identification information of data may include meta data which is a structured attribute information on data. The information for accessing the display apparatus 200 may include media access control (MAC) address information, Bluetooth (BT) address information, identification (ID) information, network ID, digital subscriber line access multiplexer (DSLAM) location, asynchronous transfer mode (ATM) channel ID information, wireless local area network (FLAN) access point, broadband remote access server (BRAS) ID, mobile network code, session initiation protocol (SIP) proxy signal, and the like which has the authorization to access the display apparatus 200.

In addition, the communicator 220 may include various communication protocols for connecting with the electronic pen 100 for communication based on a data size corresponding to user selected content using the electronic pen 100. The communication protocol may be a near field communication (NFC), Bluetooth, or Wi-Fi, without being limited thereto and may be of various forms.

The communicator 220 may receive a signal for requesting data by the external display apparatus 300. The signal for requesting data may include a token generated based on data identification information and access information the electronic pen 100 received from the display apparatus 200. If the signal received from the external display apparatus 300 satisfies a predetermined condition, the communicator 220 may use the electronic pen 100 to directly transfer data corresponding to the user selected content to the external display apparatus 300. The predetermined condition may include the condition of the transmission request information (e.g., token generated by the electronic pen 100) received from the external display apparatus 300 and information that the display apparatus 200 transmitted to the electronic pen 100 matching.

The communicator 220 may be a configuration performing communication with an external apparatus of various types based on a communication method of various types. The communicator 220 may include at least one of a Wi-Fi chip, a Bluetooth Chip, a wireless communication chip, and a NFC chip. The processor 240 may use the communicator 220 to perform communication with various external apparatuses including the electronic pen 100 or the external display apparatus 300.

Specifically, each of the Wi-Fi chip and the Bluetooth chip may perform communication through a Wi-Fi method and a Bluetooth method. When using a Wi-Fi chip or a Bluetooth chip, various connection information such as service set identifier (SSID) and session key may be first transmitted and received, and various information (nay be transmitted and received after performing communication connection using thereof. The wireless communication chip may refer to a chip performing communication according to various communication standards such as Institute of Electrical and Electronics Engineers (IEEE), ZigBee, 3rd generation (3G), 3rd generation partnership project (3GPP), and long term evolution (LTE). The NFC chip may refer to a chip that operates in a NFC method using a 13.56 MHz band of various radio frequency identification (RF-ID) frequency bands such as 135 kHz, 13.56 MHz, 433 MHz, 860-960 MHz, and 2.45 GHz.

The memory 230 (nay store various data for the overall operation of the display apparatus 200 such as programs for the processing and controlling of the processor 240. Specifically, the memory 230 may store information on a storage capacity of the electronic pen 100. In addition, the memory 230 may store data for sharing with the external display apparatus 300, identification information on data, and information for accessing the display apparatus 200, and may store access information on the external display apparatus 300 based on receiving a data transfer request from the external display apparatus 300.

The memory 230 may store a plurality of application programs (i.e., application programs or applications) driven in the display apparatus 200, data for the operation of the display apparatus 200, and instructions. At least some of the application programs may be downloaded from the external server through a wireless communication. In addition, at least some of the application programs may be present on the display apparatus 200 from the time of shipment for the basic function of the display apparatus 200. The application program may be stored in the memory 230 and may be driven by the processor 240 to perform an operation (or, function) of the display apparatus 200.

The memory 230 may store various programs and data necessary in an operation of the display apparatus 200. The memory 230 may be implemented as a non-volatile memory, volatile memory, flash-memory, hard disk drive (HDD), a solid state drive (SSD), or the like. The memory 230 may be accessed by the processor 240, and reading/recording/modifying/deleting/updating and the like of data may be performed by the processor 240. In the disclosure, the term memory may include the memory 230, a read only memory (ROM) in the processor, a random access memory (RAM) or a memory card (not shown) (e.g., micro secure digital (SD) card, memory stick) mounted to the display apparatus 200. In addition, the memory 230 may include a buffer which temporarily stores various data of a music content.

The memory 230 may be implemented in memory form embedded in the display apparatus 200 according to data storage purpose, or may be implemented in a memory form capable of attaching to and detaching from the display apparatus 200. For example, the data for the driving of the display apparatus 200 may be stored in a memory embedded in the display apparatus 200, and the data for extension function of the display apparatus 200 may be stored in a memory capable of attaching to and detaching from the display apparatus 200. The memory embedded in the display apparatus 200 may be implemented to forms such as a non-volatile memory, volatile memory, flash-memory, hard disk drive (HDD), a solid state drive (SSD), or the like, and the memory capable of attaching to or detaching from the display apparatus 200 may be implemented to forms such as a memory card micro SD card, universal serial bus (USB) memory, etc.) and an external memory (e.g., USB memory) capable of connecting to a USB port.

The processor 240 may be a configured to overall control the display apparatus 200. Specifically, the processor 240 may control the overall operation of the display apparatus 200 using various programs stored in the memory 230 of the display apparatus 200. More specifically, the processor 240 may, when the user selects a content object on the display 210 with the electronic pen 100, check the size of data corresponding to the selected content. In addition, the processor 240 may, when the user draws a closed curve which includes some areas of a content object on the display with the electronic pen 100, check the size of data on the some area.

The processor 240 may be configured to, when the size of the data is less than or equal to a predetermined first value, control the communicator 220 to connect with the electronic pen via NFC protocol, and when the size of the data exceeds the predetermined first value and is less than or equal to a predetermined second value, control the communicator 220 to connect with the electronic pen 100 via Bluetooth protocol, and when the size of the data exceeds the predetermined second value, control the communicator 220 to connect with the electronic pen 100 via Wi-Fi protocol. The predetermined first value may be 3 MB, and the predetermined second value may be 40 MB, hut is not limited thereto.

The processor 240 may be configured to, based on identifying the data size as being less than or equal to a data storage capacity of the electronic pen 100 stored in the memory 230, control the communicator 110 to transmit the data corresponding to the selected content to the electronic device 100. Alternatively, the processor 240 may be configured to, based on identifying the data size as exceeding the data storage capacity of the electronic pen 100 stored in the memory 230, control the communicator 220 to transmit identification information of data corresponding to the selected content and information for accessing the display apparatus 200 to the electronic pen 100. The identification information of data may include a time stamp information on the data. The time stamp information may be a time unit parameter which displays at a specific location in order to prove at which location the data is stored and present. The identification information of data may include meta data which is a structured attribute information on data. The information for accessing the display apparatus 200 may include MAC address information, BT address information, ID information, network ID, DSLAM location, ATM channel ID information, WLAN access point, BRAS ID, mobile network code, SIP proxy signal, and the like which has the authorization to access the display apparatus 200.

In addition, when the communicator 220 receives a token for requesting data to be transferred from the external display apparatus 300, the processor 240 may be configured to check whether the information included in the token received from the external display apparatus 300 and the information transmitted to the electronic pen 100 is a match. If the information match one another upon verification, the processor 240 may be configured to control the communicator 220 to perform communication connection to directly transmit data to the external display apparatus 300. In addition, the processor 240 may be configured to, based on being connected to the external display apparatus 300 through the communicator 20, control the communicator 220 to transmit data.

In addition, the processor 240 may include a central processing unit (CPU), a RAM, a ROM, and a system bus. The ROM may be a configuration which is stored with an instruction set for booting the system, and the CPU may copy an operating system (O/S) stored in the memory of the display apparatus 200 to the RAM, and execute the O/S to boot the system. When booting is completed, the CPU may copy the various applications stored in the memory 230 to the RAM, and execute the various applications to perform various operations. The processor 240 has been described above as including only one CPU, but may be implemented as a plurality of CPUs (or, digital signal processor (DSP), system on chip (SoC), etc.) upon implementation.

In the following, an embodiment of a user sharing data desired to be shared from the display apparatus 200 to the external display apparatus 300 will be described through FIGS. 3 to 9.

Figure 3:
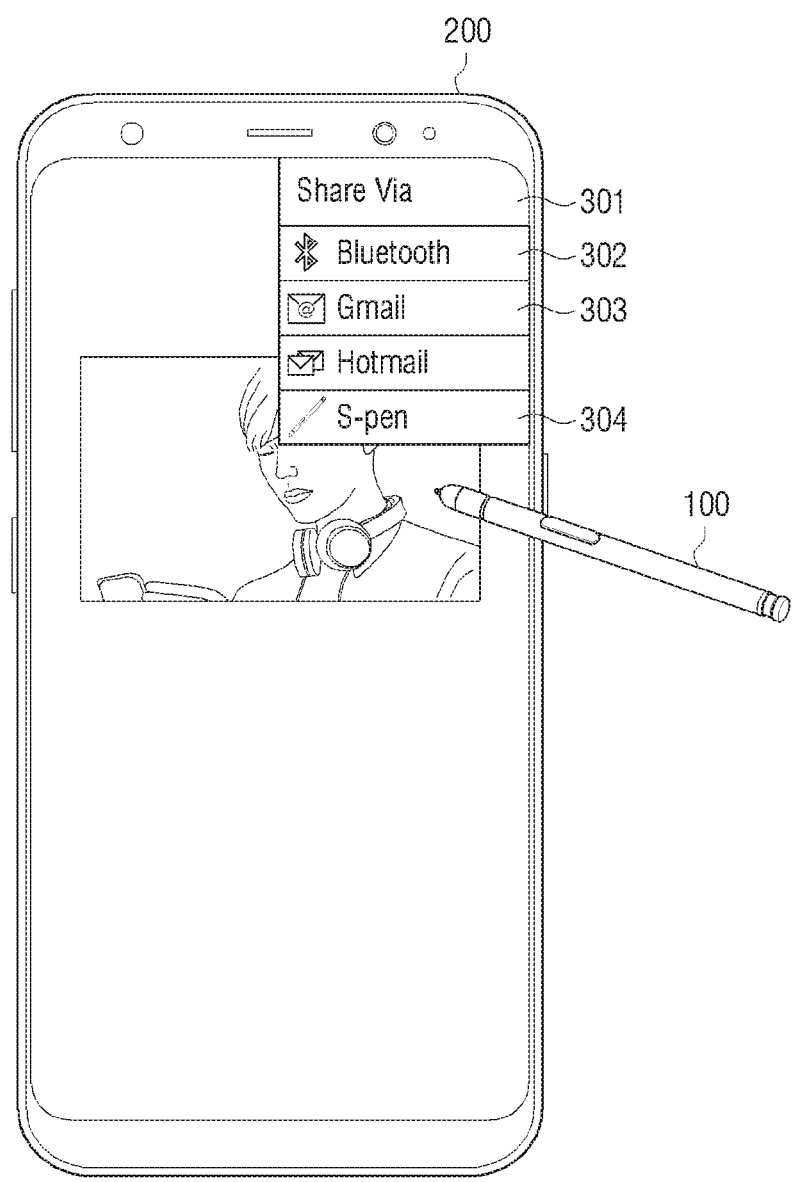
FIG. 3 is a diagram illustrating a UI for data sharing according to an embodiment of the disclosure.

The display apparatus 200 may, based on receiving user input of selecting data to be shared by the user through input means such as a finger or the electronic pen 100, provide a user interface (UI) for selecting the means for sharing with the external display apparatus 300. For example, FIG. 3 is a diagram illustrating a display apparatus 200 providing a user interface (UI) 301 to select a means for sharing data.

When the user selects a Bluetooth icon 302 displayed on the UI 301, the display apparatus 200 may search subjects for Bluetooth connection as with conventional display apparatuses, and may transmit to an external display apparatus 300 through Bluetooth. Likewise, when the user selects a mail icon 303 displayed on the UI 301, the display apparatus 200 may transmit data to the external display apparatus 300 through mail as with conventional display apparatuses.

If the user selects a S-Pen icon 304 displayed on the UI 301, the display apparatus 200 may share data through the electronic pen 100. In order to share data through the electronic pen 100, the display apparatus 200 may be connected to the electronic pen 100 through the communicator 220.

Figure 4:
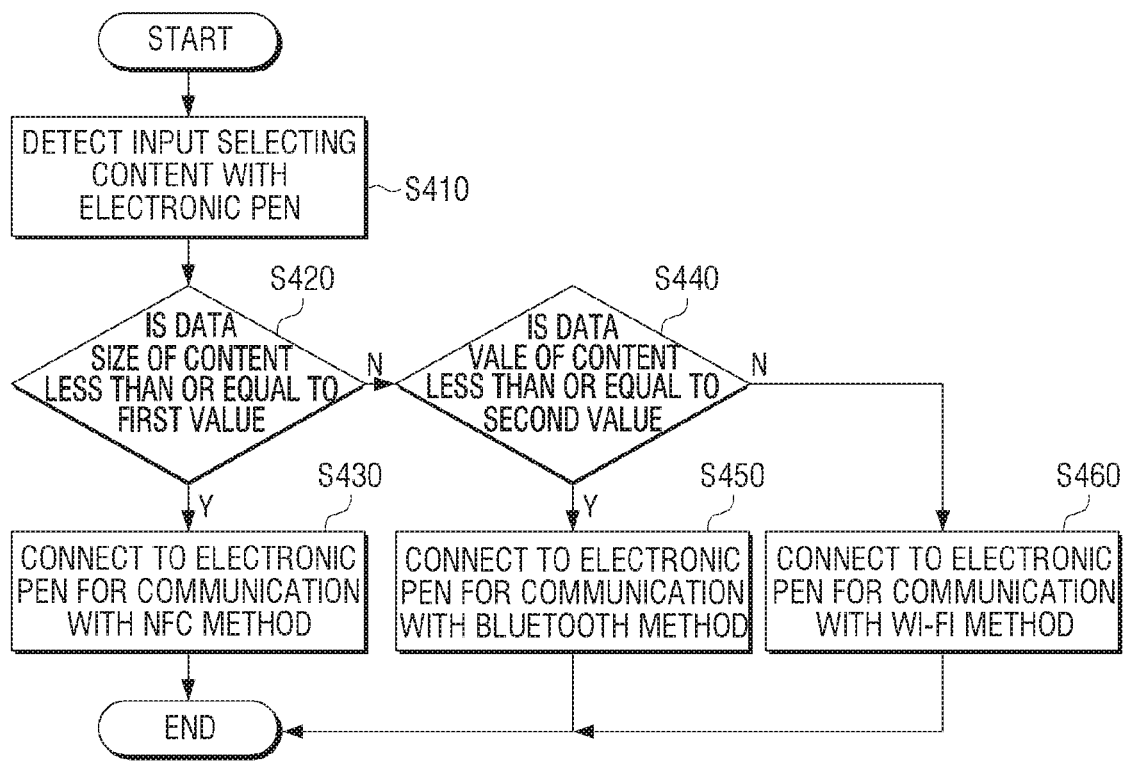
FIG. 4 is a flowchart illustrating communication connectivity of an electronic pen with a display apparatus according to an embodiment of the disclosure.

Specifically, a process of sharing data from the display apparatus 200 to the external display apparatus 300 will be described through FIGS. 4 to 7. Referring to FIG. 4, the display apparatus 200 may, based on detecting user input selecting content with the electronic pen 100 (S410), identify whether the selected content data size is less than or equal to the first value (S420). The display apparatus 200 may, based on the data size being less than or equal to the first value, connect with the electronic pen 100 through the communicator 220 for communication via NFC protocol (S430). If the data size is identified as greater than the first value (S420-N), the display apparatus 200 may identify whether a content data value is less than or equal to the second value (S440). If the data size is identified as less than or equal to the second value (S440-Y), the display apparatus 200 may establish a communication connection with the electronic pen 100 via Bluetooth protocol (S450). If the data size is identified as exceeding the second value (S440-N), the display apparatus 200 may establish a connection with the electronic pen 100 for communication via Wi-Fi protocol (S460).

The first value may be 3 MB, the second value may be 40 MB, and the third value may be 300 MB, but is not limited thereto, and the predetermined value may be adjusted so that a communication protocol most capable of efficiently transmitting based on data size is be selected. Specifically, the Bluetooth may generally transmit at a rate of 25 Mbps (Mega bit per second) as a wireless connection (e.g., wireless personal area network (WPAN)) between portable electronic devices with a frequency of 2.4 GHz, and may require loss compression due to a narrow bandwidth. Accordingly, when the time required to transmit data to the electronic pen 100 is 1 second or more due to data size becoming larger, a sensitive user may experience an inconvenient user experience. In this case, by setting the second value to 25 MB or less, the display apparatus 200 may connect with the electronic pen 100 for communication via Wi-Fi for data exceeding 25 MB.

The display apparatus 200 connected with the electronic pen 100 for communication with the above described methods may identify whether to transmit data according to the size of content data or transmit identification information of data.

Figure 5:
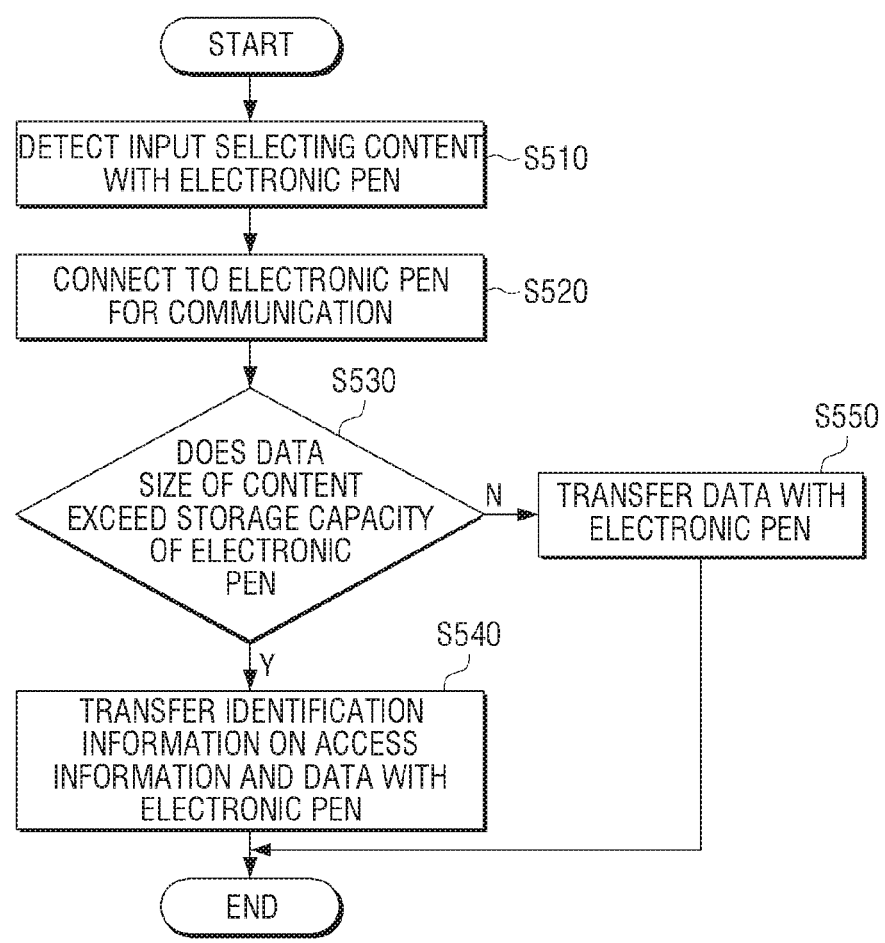
FIG. 5 is a flowchart illustrating a display apparatus transmitting information related to data to an electronic pen according to an embodiment of the disclosure.

Specifically, referring to FIG. 5, based on detecting user input selecting the content to be shared with the electronic pen 100 (S510), the display apparatus 200 may connect with the electronic pen for communication through the method described in FIG. 4 (S520). The display apparatus 200 may identify whether the size of content data exceeds the storage capacity of the electronic pen 100. If the size of content data exceeds the storage: capacity of the electronic pen 100 (S530-Y), the display apparatus 200 may transmit access information for accessing the display apparatus 200 and identification information on data to the electronic pen 100 (S540). The identification information of data may include the time stamp information on the data. The time stamp information may be a time unit parameter which displays at a specific location in order to prove at which location the data is stored and present. The identification information of data may include meta data which is a structured attribute information on data. The information for accessing the display apparatus 200 may include MAC address information, BT address information, ID information, network ID, DSLAM location, ATM channel ID information, WLAN access point, BRAS ID, mobile network code, SIP proxy signal, and the like which has the authorization to access the display apparatus 200.

If the size of the content data does not exceed the storage capacity of the electronic pen 100 (S530-N), the display apparatus 200 may transmit data to the electronic pen 100. That is, the electronic pen 100 connected with the display apparatus 200 for communication may receive data itself from the display apparatus 200.

Figure 6:
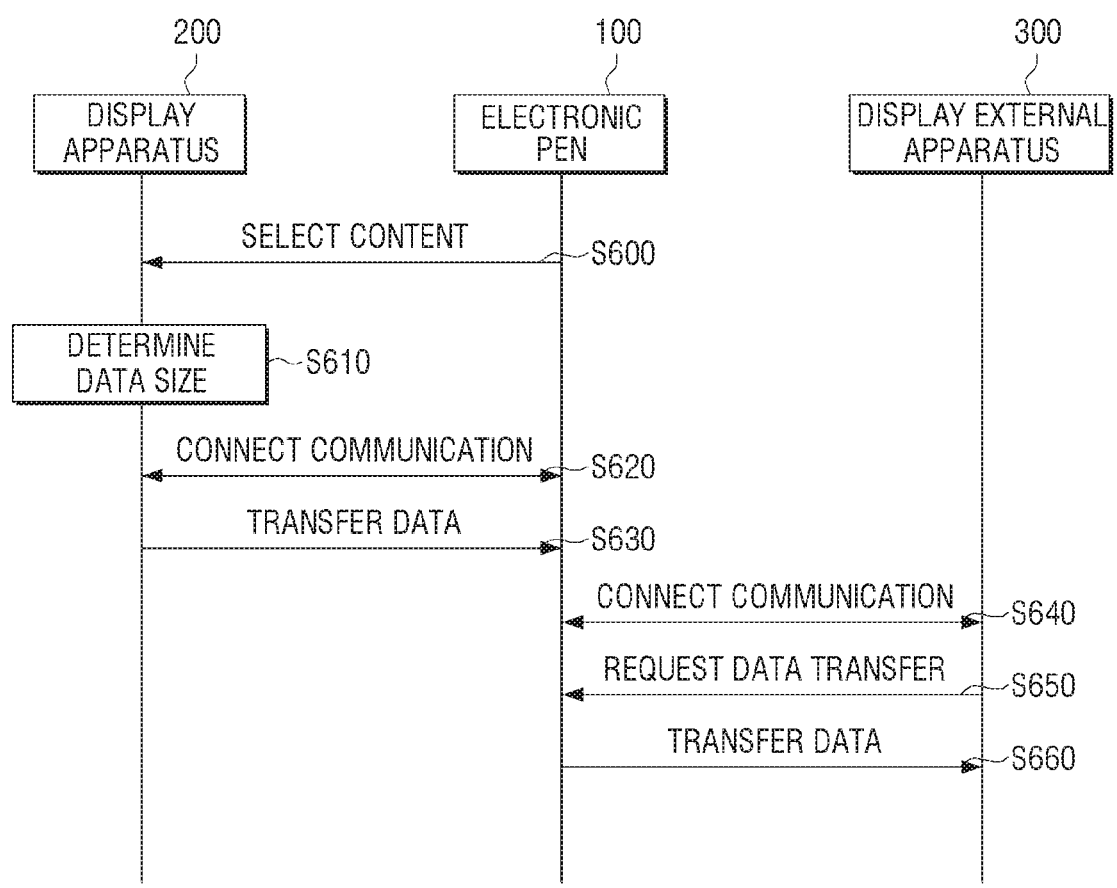
FIG. 6 is a sequence diagram illustrating a display apparatus transmitting data to an external display through an electronic pen according to an embodiment of the disclosure.
Figure 7:
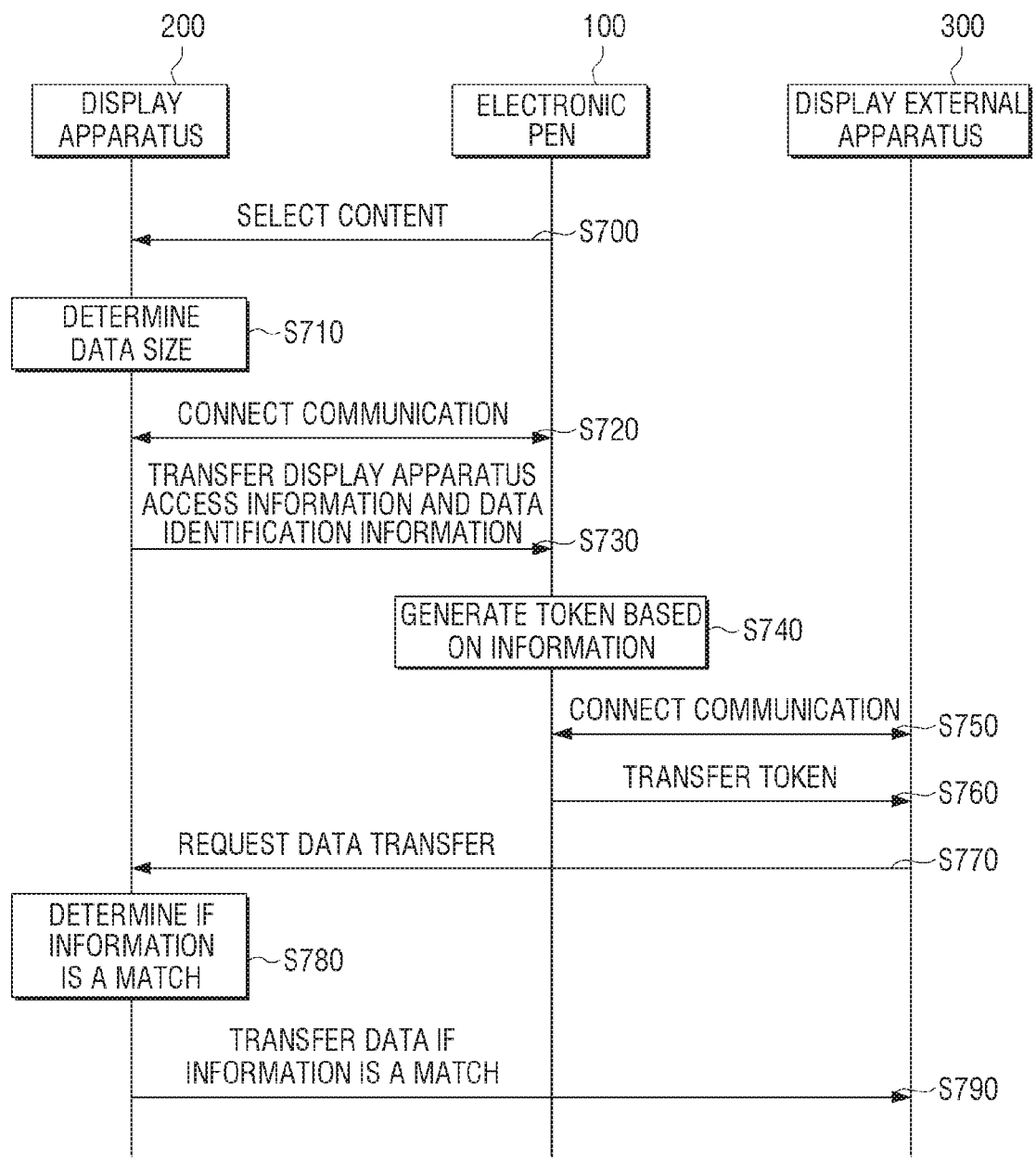
FIG. 7 is a sequence diagram illustrating a display apparatus transmitting data to an external display through an electronic pen according to an embodiment of the disclosure.

FIGS. 6 and 7 are sequence diagrams illustrating the above-described data sharing process.

Specifically, FIG. 6 is a diagram illustrating a process of sharing data included in the display apparatus 200 with the external display apparatus 300 when the size of data selected with the electronic pen 100 is less than or equal to the storage capacity of the electronic pen 100. Referring to FIG. 6, the user may use the electronic pen 100 to select content displayed on the display 210 of the display apparatus 200 (S600). The display apparatus 200 may identify the data size (S610), and use a suitable communication protocol based on the identified result to establish connection with electronic pen 100 for communication (S620). In addition, the display apparatus 200 may, based on identifying that the data size in S610 is smaller than the storage capacity of the electronic pen 100, transfer data to the electronic pen 100 (S630).

The electronic pen 100 may then establish a connection with the external display apparatus 300 for communication through an interaction (S640). The interaction with the external display apparatus 300 may be similar with the interaction between the electronic pen 100 and the display apparatus 200. For example, the interaction may include touching the display 310 of the external display apparatus 300 with the electronic pen 100 or a gesture of hovering. When a data transfer request is received from the external display apparatus 300 (S650), the electronic pen 100 may transfer data transmitted from the display apparatus 200 to the external display apparatus 300.

The data sharing process of the disclosure is not limited to the process described in FIG. 6, but may follow various orders. For example, in FIG. 6, although it has been described as content being selected (S600) and connecting the communication of the display apparatus 200 and the electronic pen 100 (S620), the process may proceed in the order of first connecting the communication of the display apparatus 200 and the electronic pen 100 and then selecting content with the electronic pen 100.

FIG. 7 is a diagram illustrating a process of sharing data included in the display apparatus 200 with the external display apparatus 300 when the size of the data selected with the electronic pen 100 exceeds the storage capacity of the electronic pen 100. Referring to FIG. 7, the user may use the electronic pen 100 to select content displayed on the display 210 of the display apparatus 200 (S700). The display apparatus 200 may identify the data size (S710), and use an appropriate communication protocol based on the identified result to establish a connection with the electronic pen 100 for communication (S720). In addition, the display apparatus 200 may, based on identifying that the data size in S710 exceeds the storage capacity of the electronic pen 100, transfer display apparatus access information and data identification information to the electronic pen 100 (S730). The display apparatus 200 may copy and store the corresponding data, and map a location information on the copied data and a copied time information to the identification information on the data and transmit to the electronic pen 100.

The electronic pen 100 may generate a token which includes display apparatus access information and data identification information transmitted from the display apparatus 200 (S740). The identification information of data may include meta data, and the information for accessing may include ID information, network ID, DSLAM location, ATM channel ID information, WLAN access point, BRAS ID, mobile network code, SIP proxy signal, and the like which has the authorization to access the display apparatus 200. The token may include a control hit included in front of an information bit of data packets capable of transmitting and receiving. In addition, the token may include length information on content to be transferred, Bluetooth address information, MAC address information, and time stamp information.

The electronic pen 100 may then establish connection with the external display apparatus 300 for communication through an interaction (S750). When connection with the external display apparatus 300 is established, the electronic pen 100 may transfer the generated token to the external display apparatus 300 (S760). The external display apparatus 300 which received the token may transmit a data transfer request signal to the display apparatus 200 based on access information on the display apparatus 200 included in the token (S770). In the data transfer request signal, access information on the display apparatus, data identification information, network ID information of the external display apparatus 300, and the like included in the token may be included.

. . 또한, token 에 포함된 display apparatus 200 에 대한 access information 와 display apparatus 200의 network information 가 일치하는지 판단할 수 있다. The display apparatus 200 may identify whether the data identification information transmitted to the electronic pen 100 by the display apparatus 200 and the information included in the transfer request signal transmitted from the external display apparatus 300 is a match (S780). Specifically, the display apparatus 200 may identify whether the data identification information transmitted to the electronic pen 100 and the data identification information included in the token is a match.

If the identification result information is confirmed as matching, the display apparatus 200 may directly transmit the corresponding data to the external display apparatus 300. Specifically, based on a network information of the external display apparatus 300 included in the data transfer request signal received from the external display apparatus 300, the display apparatus 200 may transmit data through a Wi-Fi communication connection. Generally, since directly transmitting from the display apparatus 200 to the external display apparatus 300 corresponds to data size being too large, using a Wi-Fi protocol is most common, but the embodiment is not limited thereto, and may be transmitted via various communication protocols. A data token passing share method is one of the control methods in a local area network. Specifically, the data token passing share method involves a control bit designated as a token in front of an information bit of the data packets being transmitted and securing a transmitting right using the token. That is, the external display apparatus 300 which may receive data at some point is limited as an apparatus with the token secured. Accordingly, by using the methods above, there may be the effect of no conflict of data occurring even when content between several external display apparatuses are shared.

The data sharing process of the disclosure is not limited to the process described in FIG. 7, and may follow various orders. For example, in FIG. 7, although it has been described as content being selected (S700) and connecting the communication of the display apparatus 200 and the electronic pen 100 (S720), the process may proceed in the order of first connecting the communication of the display apparatus 200 and the electronic pen 100 and then selecting content the electronic pen 100.

FIGS. 8A, 8B, 9A, and 9B are diagrams exemplarily illustrating sharing of data from a display apparatus 200 to an external display apparatus 300 through an electronic pen 100 using the above-described method.

Figure 8A:
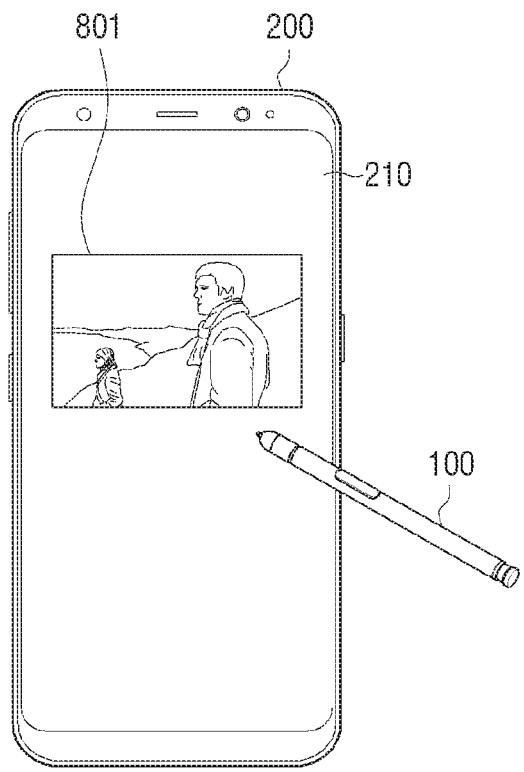
FIGS. 8A and 8B are diagrams illustrating a display apparatus transmitting data to an external display through an electronic pen according to an embodiment of the disclosure.
Figure 8B:
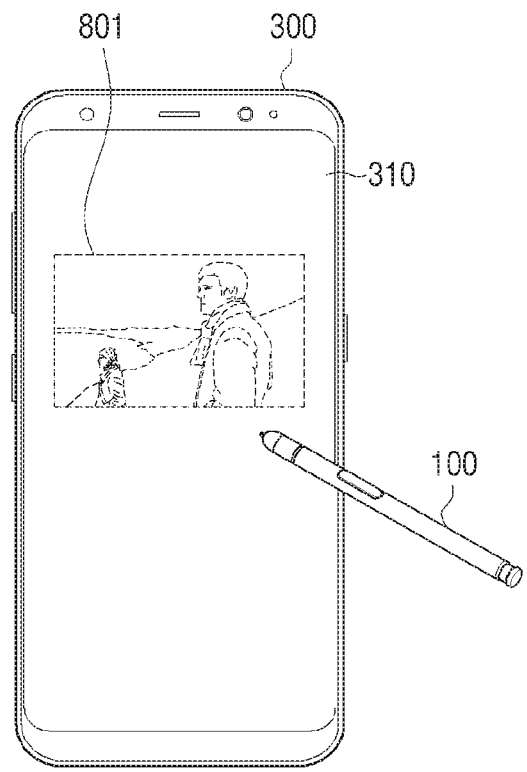

As illustrated in FIG. 8A, the user may use the electronic pen 100 to select an object 801 on a content displayed on the display 210 of the display apparatus 200. If the user selects a content object displayed in the display apparatus 200 with the electronic pen 100 while manipulating a user manipulator 110 of the electronic pen 100, the display apparatus 200 may provide a UI as in FIG. 3 to share the selected content data.

The display apparatus 200 through the method described in FIG. 4 may then connect with the electronic pen 100 for communication, and then transmit the corresponding information in the display apparatus 200 to the electronic 100 through the method described in FIG. 5. The external display apparatus 300 may then through the method described in FIGS. 6 to 7 receive transfer of data included in the display apparatus 200, and may display the content object 801 corresponding to the received shared data as in FIG. 8B on the display 310 of the external display apparatus 300.

Figure 9A:
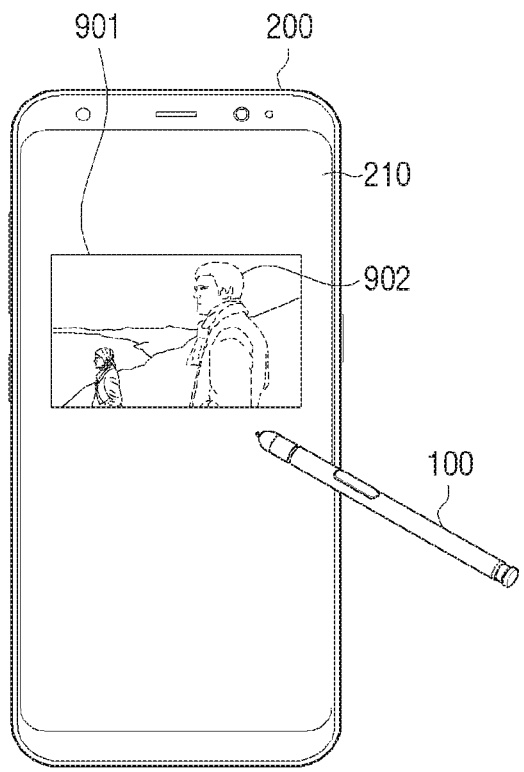
FIGS. 9A and 9B are diagrams illustrating a display apparatus transmitting a part of a data to an external display through an electronic pen according to an embodiment of the disclosure.
Figure 9B:
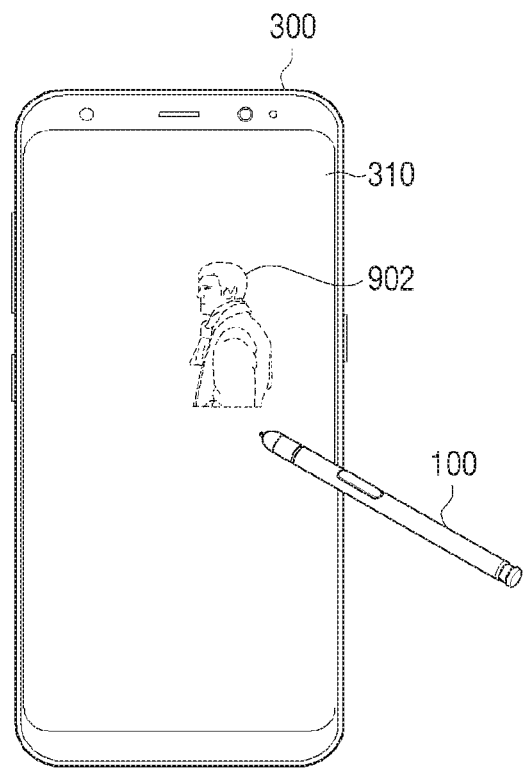

The user may select only some objects 902 included in the content object 901 to share with the external display apparatus 300 as in FIGS. 9A and 9B. That is, as in FIG. 9A, the user may use the electronic pen 100 to select only some objects 902 of the content object 901. If, at this time, the user draws a closed curve moving a touch point to include some of the content object displayed in the display apparatus with the electronic pen 100 while manipulating the user manipulator 110 of the electronic pen 100, the display apparatus 200 may provide a UI as in FIG. 3 to share data on some of the content objects.

The display apparatus 200 through the method described in FIG. 4 may then connect with the electronic pen 100 for communication, and transmit corresponding information in the display apparatus to the electronic pen through the method described in FIG. 5. Through the method described in FIGS. 6 to 7, the external display apparatus 300 may receive data included in the display apparatus 200, and display only some objects 902 of the content object 901 corresponding to the received shared data on the display 310 of the external display apparatus 300 as in FIG. 9B.

In the disclosure, sharing of data on image content or some areas included in the image content has been described, but the embodiment is not limited thereto. Specifically, data may be shared for text content or some areas included in the text content, and data may be shared on moving image content or some still images included in the moving image content.

The display apparatus 200 may perform a different control operation based on a signal output from the electronic pen 100. For example, if the user has the electronic pen 100 touching the display and is moving the touch point, the display apparatus 200 may display a line along the path of movement thereof. Alternatively, the display apparatus 200 may also change the function of the electronic pen 100 to line drawing function, eraser function, cutting function, and the like based on the state of manipulation.

In addition, when the user selects the content object displayed on the display apparatus 200 with the electronic pen 100 while manipulating the user manipulator 110, the display apparatus 200 may provide the UI as in FIG. 3 to share the selected content data, or may transmit the data to the electronic pen 100. In addition, when the user draws a closed curve by moving the touch point to include some of the content objects displayed in the display apparatus 200 with the electronic pen 100 while manipulating the user manipulator 110, the display apparatus 200 may provide a UI for sharing data on some of the content objects, and may transmit data on some content to the electronic pen 100.

The electronic pen 100 may be included in the display apparatus from the time of shipment and may control the display apparatus 200, and may be sold separately and may be connected to control the display apparatus 200.

The electronic pen 100 may be inserted into an insertion grove (not shown) of the display apparatus 200 to be separable. The length of the electronic pen 100 may be appropriately designed considering the dimension (length, height, width, etc.) of the display apparatus 200. The user may store the electronic pen 100 by inserting in the groove of the display apparatus 200 when not in use, and may use the electronic pen 100 by separating the electronic pen 100 from the groove only when necessary. The user manipulator 110 which may be manipulated by the user is provided on the electronic pen 100.

Figure 10:
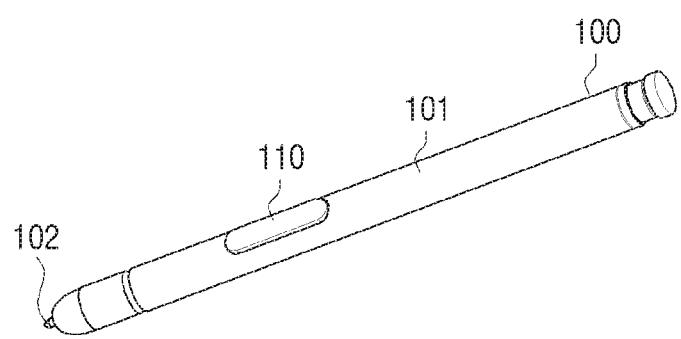
FIG. 10 is a diagram illustrating an exterior of an electronic apparatus according to an embodiment of the disclosure.

Referring to FIG. 10, the electronic pen 100 according to an embodiment may be implemented in pen form having a certain length in a thin and long form for the user to comfortably grasp. Accordingly, although the electronic pen 100 may be differently designated to various terms such as an input apparatus, a pen-type input apparatus, a stylus pen, and an S-Pen, it may not necessarily be implemented in a pen form. For example, the electronic pen 100 may be implemented to have a stubby or a flat shaped body.

In addition, as in FIG. 10, the electronic pen 100 may include a case 101, a conductive tip 102, and a user manipulator 110 as an external configuration.

The case 101 may refer to a main body forming the exterior of the electronic pen 100. The case 101 may be integrally formed, but may also be divided into numerous parts and made in an inter-combined form.

The user manipulator 110 may be a part which the user may directly manipulate. A movable member of the user manipulator 110 may be implemented to various forms such as a slide button method capable of moving position while sliding on the case 101, a wheel button method capable of rotating on the case 101, and a push button method which may be moved inward toward the inner direction of the case 1010 by a user push.

The electronic pen 100 may be implemented through various methods such as an electronic current resonance (ECR) method, an electromagnetic resonance (EMR) method, and an active method. If implemented in the ECR method, the electronic pen 100 may include a conductive tip 102 disposed on one end of the case 101. If implemented with the EMR method, the electronic pen 100 may include a coil which induces electricity by an external magnetic field signal. In the active method, the electronic pen 100 may further include a battery.

Because FIG. 10 illustrates an input apparatus of an ECR method as an example, a conductive tip 102 may also be included, but if implemented in a different method as described above, the conductive tip 102 may be omitted.

The conductive tip 102 may be formed, for example, in a metallic tip. The conductive tip 102 may be implemented in the form of a non-conductive material being present within or a part of the conductive tip 102 being exposed externally. In addition, for a smooth writing sensation upon use, an insulator which prevents the conductive tip 102 from directly contacting the display may be further included.

The case 101 may consist of a conductor, and may be contacted with a ground terminal of a printed circuit board which is disposed inside the case 101 through circuitry. In FIG. 10, although the case 101 has been illustrated in a cylinder form, the embodiment is not necessarily limited thereto. For example, the case 101 may be implemented to various forms such as a square pillar or a hexagonal pillar.

Figure 11:
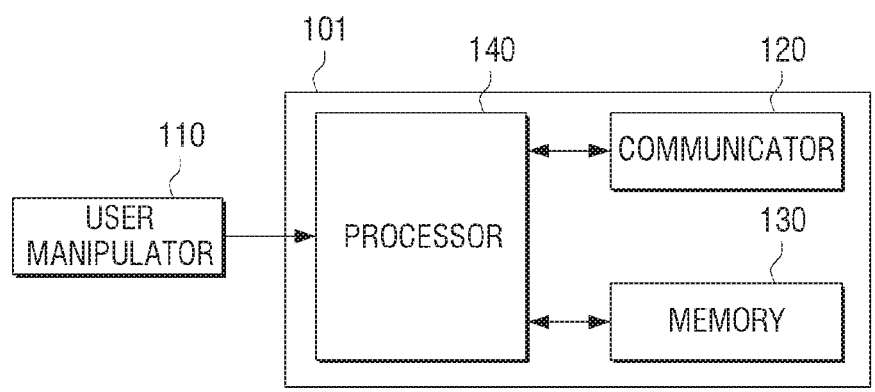
FIG. 11 is a block diagram illustrating elements consisting an electronic pen according to an embodiment of the disclosure.

Referring to FIG. 11, the electronic pen 100 may include a communicator 120, a memory 130, and a processor 140 as an inner configuration the case 101.

The user manipulator 110 may include a movable member disposed to be movable on the case, a first electrode fixed in the case, and a second electrode disposed at a side of the movable member to face the first electrode and a facing area with the first electrode may be variable based on movement of the movable member. The first electrode and the second electrode may function as a kind of capacitor. A separate dielectric may be provided between the first electrode and the second electrode, and the first electrode and the second electrode may be disposed spaced apart at a certain distance without a particular dielectric. Accordingly, if the user moves the movable member, the facing area between the first electrode and the second electrode may be varied, and thus a capacitance value may be changed.

Consequently, the user manipulator 110 may provide a capacitance of different value based on the state of manipulation thereof to a processor 140. Accordingly, because the capacitor value of a resonant circuit in the processor 150 may be varied, the resonant frequency of the electric field signal generated in the processor 140 may be changed.

The communicator 120 may be a configuration which connects the electronic pen 100 to perform communication with the display apparatus 200 and the electronic display apparatus 300. The communicator 120 may be a configuration for performing communication with external apparatuses of various types (e.g., display apparatus 200, external display apparatus 300) based on communication methods of various types. The communicator 120 may include at least one of a Wi-Fi chip, a Bluetooth chip, a wireless communication chip, and a NFC chip.

Specifically, each of the Wi-Fi chip and the Bluetooth chip may perform communication with a Wi-Fi method and a Bluetooth method. When using the Wi-Fi chip or the Bluetooth chip, various connection information such as SSID and session key may be first transmitted and received, and various information may be transmitted and received after performing communication connection using thereof. The wireless communication chip may refer to a chip performing communication according to various communication standards such as IEEE, ZigBee, 3G, 3GPP, and LTE. The NFC chip may refer to a chip that operates in a NFC method using a 13.56 MHz band of various RF-ID frequency bands such as 135 kHz, 13.56 MHz, 433 MHz, 860-960 MHz, and 2.45 GHz.

The memory 130 may store various programs and data necessary in the operation of the electronic pen 100. Specifically, the memory 130 may include various information such as content data received from the display apparatus 200, data identification information, information for accessing the display apparatus 200, and a token generated in the processor 140 through data identification information and access information. The time stamp information may be a time unit parameter which displays at a specific location in order to prove at which location the data is stored and present. Specifically, the identification information of data may include meta data which is a structured attribute information on data. In addition, the information for accessing the display apparatus 200 may include ID information, network ID, DSLAM location, ATM channel ID information, WLAN access point, BRAS ID, mobile network code, SIP proxy signal, and the like which has the authorization to access the display apparatus 200. In addition, the token may be a control bit that is present in front of the information bit of data packets for using the local area network.

The memory 130 may be implemented as a non-volatile memory, a volatile memory, a flash-memory, a hard disk drive (HDD), a solid state drive (SSD), or the like. The memory 130 may be accessed by the processor 140, and reading/recording/modifying/deleting/updating and the like of data may be performed by the processor 140. In the disclosure, the term memory may include the memory 130, the ROM in the processor, the RAM, or a memory card (not shown) (e.g., micro secure digital (SD) card, memory stick) mounted to the electronic pen 100.

The processor 140 may generate a different signal based on instructions received from the user manipulator 110. As described above, referring to the electronic pen 100 implemented by the ECR method as an example, the processor 140 may receive an electric field signal through the conductive tip (not shown) formed at one end of the case of the electronic pen 100. The processor 140 may include an inductor connected to the conductive tip and a resonant circuit consisting of a capacitor. The resonant circuit in the processor 140 may resonate by the electric field signal introduced through the conductive tip, and may generate an electric field signal. The resonance frequency of the electric field signal generated in the processor 140 may be varied based on the state of the user manipulator 110.

The processor 140 may store data in the memory 130 when data from the display apparatus 200 which is touched by the electronic pen 100 is transmitted. In addition, when the electronic pen 100 touches the external display apparatus 300, the communicator 120 may be controlled to transfer data to the external display apparatus 300.

The processor 140 may receive identification information on an object and access information on the display apparatus 200 from the display apparatus 200 touched by the electronic pen 100 through the communicator 120, and may store in the memory 130. The processor 140 may, for the token passing which is one of the control methods with respect to the local area network, generate a control bit designated as a token in front of the information bit of the data packets for transmitting. The token may be included with identification information on an object from the display apparatus 200 and access information on the display apparatus 200.

When the electronic pen 100 touches the external display apparatus 300, the processor 140 may be configured to control the communicator 120 to transmit the token stored in the memory 130 to the external display apparatus 300.

According to an embodiment, the processor 140 or the processor 240 may be implemented as a DSP processor which processes digital signals, a microprocessor, and a time controller (TCON). However, the embodiment is not limited thereto, and may include one or more of a CPU, a micro controller unit (MCU), a controller, an application processor (AP), a communication processor (CP), and an ARM processor, or may be defined in the corresponding term. In addition, the processor 140 or the processor 240 may be implemented as a system on chip SoC) with a processing algorithm built therein, and a large scale integration (LSI), and may also be implemented in a field programmable gate array (FPGA) type.

Figure 12:
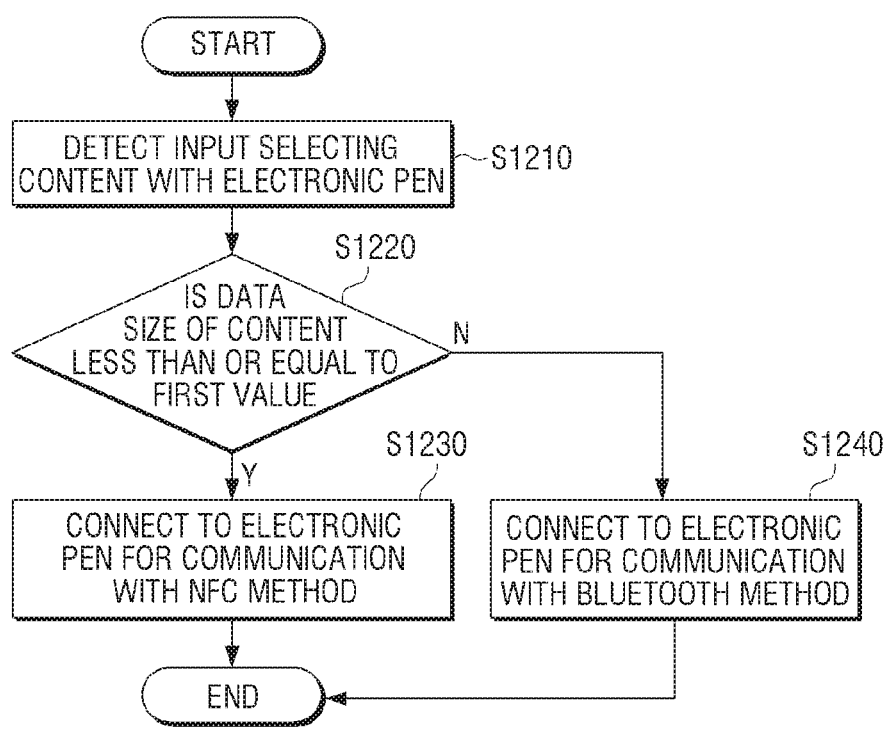
FIGS. 12 and 13 are diagrams illustrating a process of a display apparatus and an electronic pen performing communication connection.
Figure 13:
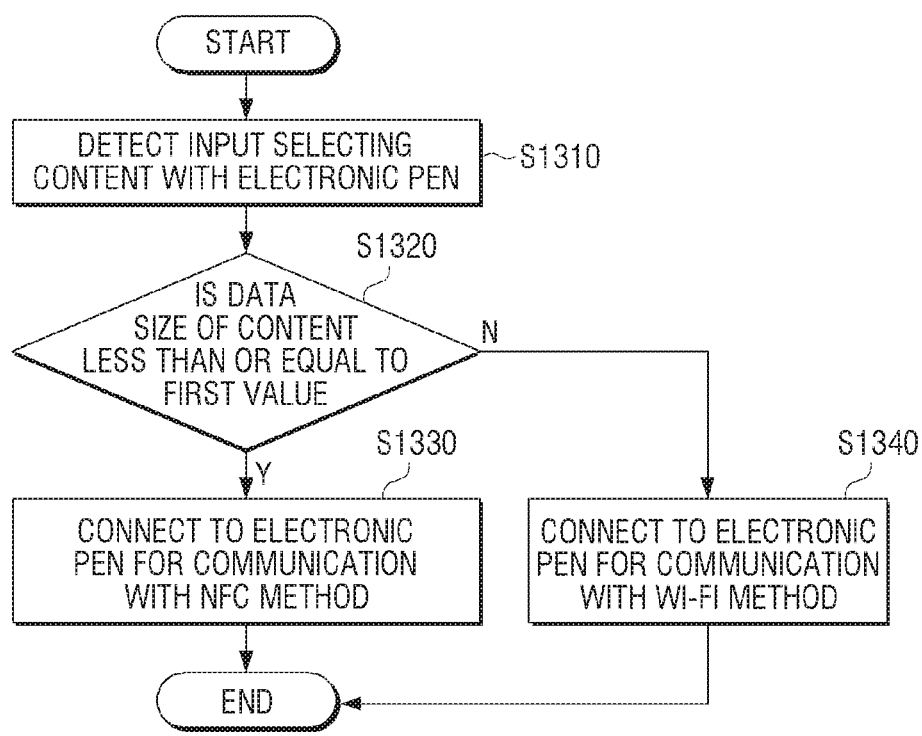

FIGS. 12 and 13 are diagrams illustrating a process of a display apparatus 200 and an electronic pen 100 performing a communication connection.

Specifically, referring to FIG. 12, the display apparatus 200 may, based on detecting user input selecting the content with the electronic pen 100 (S1210), identify whether the data size of the selected content is less than or equal to a first value (S1220). The display apparatus 200 may, based on the data size being less than or equal to the first value, connect with the electronic pen 100 for communication through the communicator 200 via NFC protocol (S1230). When the data size is identified as greater than the first value (S1220-N), the display apparatus 200 may establish connection with the electronic pen 100 for communication with a Bluetooth protocol (S1240).

In addition, referring to FIG. 13, the display apparatus 200 may, based on detecting user input selecting the content with the electronic pen 100 (S1310), identify whether the data size of the selected content is less than or equal to a first value (S1320). The display apparatus 200 may, based on the data size being less than or equal to the first value, connect with the electronic pen 100 for communication through the communicator 220 via NFC protocol (S1330). If the data size is identified as being greater than the first value (S1320-N), the display apparatus 200 may establish a connection with the electronic pen 100 for communication with a protocol (S1340).

The first value may be 3 MB, the second value may be 40 MB, and the third value may be 300 MB, but is not limited thereto, and the predetermined value may be adjusted so that a communication protocol most capable of efficiently transmitting based on data size is be selected. Specifically, the Bluetooth may generally transmit at a rate of 25 Mbps as a wireless connection (e.g., WPAN) between portable electronic devices with a frequency of 2.4 GHz, and may require loss compression due to a narrow bandwidth. Accordingly, when the time required to transmit data to the electronic pen 100 is 1 second or more due to data size becoming larger, a sensitive user may experience an inconvenient user experience. In this case, by setting the second value to 25 MB or less, the display apparatus 200 may connect with the electronic pen 100 for communication via Wi-Fi for data exceeding 25 MB.

While the disclosure has been illustrated and described with reference to various example embodiments thereof, the disclosure is not limited to the specific embodiments described. It will be understood by those skilled in the art that various changes in form and details may be made therein without departing from the spirit and scope of the disclosure.

What is claimed is:

1. A data sharing method of a display apparatus, comprising:
    displaying content comprising at least one object;
    based on one of the at least one object being selected by an electronic pen, identifying a size of data corresponding to the selected object;
    selecting one of a plurality of different communication methods for connecting to the electronic pen, based on the data size corresponding to the selected object;
    based on the data size corresponding to the selected object being less than or equal to a first value corresponding to a storage capacity of the electronic pen, transmitting the data to the electronic pen using the selected communication method;
    based on the data size corresponding to the selected object exceeding the first value, transmitting identification information on the data and access information on the display apparatus to the electronic pen using the selected communication method;
    receiving a token from an external display apparatus to which the token is transmitted by the electronic pen, the token including identification information on the data and access information on the display apparatus; and
    transmitting the data to the external display apparatus based on a correspondence between the identification information and the access information in the token and the identification information and the access information transmitted to the pen.

2. The data sharing method of claim 1, wherein the token comprises Bluetooth address information, MAC address information, and time stamp information on the data in the electronic pen.

3. The data sharing method of claim 1, wherein the selected object corresponds to an object selected using the electronic pen while a hold button provided on the electronic pen is pressed.

4. The data sharing method of claim 1, further comprising:
    based on the data size corresponding to the selected object being less than or equal to a second value, selecting Near Field Communication (NFC) for connecting to the electronic pen;
    based on the data size corresponding to the selected object exceeding the second value and being less than or equal to a third value, selecting Bluetooth for connecting to the electronic pen;
    based on the data size corresponding to the selected object exceeding the third value, selecting Wi-Fi for connecting to the electronic pen.

5. A display apparatus, comprising:
    a display;
    a communicator including communication circuitry;
    a memory storing information on a storage capacity of an electronic pen; and
    a processor,
    wherein the processor is configured to:
        control the display to display content comprising at least one object;
        based on one of the at least one object being selected by an electronic pen, identify data size corresponding to the selected object;
        select one of a plurality of different communication methods for connecting to the electronic pen, based on the data size corresponding to the selected object;
        based on the data size corresponding to the selected object being less than or equal to a first value corresponding to a storage capacity of the electronic pen, control the communicator to transmit the data to the electronic pen using the selected communication method;
        based on the data size corresponding to the selected object exceeding the first value, control the communicator to transmit identification information on the data and access information on the display apparatus to the electronic pen using the selected communication method;
        control the communicator to receive a token from an external display apparatus to which the token is transmitted by the electronic pen, the token including identification information on the data and access information on theft display apparatus; and
        control the communicator to transmit the data to the external display apparatus based on a correspondence between the identification information and the access information in the token and the identification information and the access information transmitted to the pen.

6. The display apparatus of claim 5, wherein the token comprises Bluetooth address information, MAC address information, and time stamp information on the data in the electronic pen.

7. The display apparatus of claim 5, wherein the processor is configured to, based on the electronic pen being pressed to the selected object while a hold button provided on the electronic pen is pressed, detect a data size corresponding to the selected object.

8. The display apparatus of claim 5, wherein the processor is configured to, based on the data size corresponding to the selected object being less than or equal to a second value, control the communicator to transmit the data or the identification information and the access information to the electronic pen using Near Field Communication (NFC), based on the data size corresponding to the selected object exceeding the second value and being less than or equal to a third value, control the communicator to transmit the data or the identification information and the access information to the electronic pen using Bluetooth, and based on the data size corresponding to the selected object exceeding the third value, control the communicator to transmit the data or the identification information and the access information to the electronic pen using Wi-Fi.

* * * * *